US009369562B2

(12) United States Patent
Mahajan et al.

(10) Patent No.: US 9,369,562 B2
(45) Date of Patent: Jun. 14, 2016

(54) SURFACING BUSINESS APPLICATIONS BASED ON CALLING ACTIVITIES

(75) Inventors: Milind Mahajan, Redmond, WA (US); Amit Kumar, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 13/398,351

(22) Filed: Feb. 16, 2012

(65) Prior Publication Data
US 2013/0215125 A1 Aug. 22, 2013

(51) Int. Cl.
*H04M 1/725* (2006.01)
*H04M 1/56* (2006.01)
*H04M 1/57* (2006.01)

(52) U.S. Cl.
CPC ...... *H04M 1/72525* (2013.01); *H04M 1/72569* (2013.01); *H04M 1/56* (2013.01); *H04M 1/57* (2013.01); *H04M 2250/60* (2013.01)

(58) Field of Classification Search
CPC ............... G06Q 30/02; G06Q 30/0251; G06F 17/3087; G06F 17/30867; G06F 9/4443; G06F 9/45537; G06F 17/00; H04L 67/1095; H04L 12/1813
USPC ........................ 715/864, 708, 778; 455/456.3; 705/14.14, 14.58, 14.49; 379/93.01; 707/748, E17.014; 709/227, 204; 719/313, 319; 345/522
See application file for complete search history.

(56) References Cited

U.S. PATENT DOCUMENTS

| 2002/0116459 A1* | 8/2002 | Zuberec | H04L 29/06 709/204 |
| 2007/0083827 A1* | 4/2007 | Scott | G06F 9/4443 715/811 |
| 2007/0116227 A1* | 5/2007 | Vitenson et al. | 379/207.02 |

(Continued)

OTHER PUBLICATIONS

"Marchex brings Call-based Advertising System to Skype", Retrieved on: Sep. 12, 2011, 7 pages, Available at: http://www.techflash.com/seattle/2010/07/marchex_brings_call-based_advertising_system_to_skype.html.

(Continued)

*Primary Examiner* — Amy Ng
*Assistant Examiner* — Sang H Kim
(74) *Attorney, Agent, or Firm* — Dave Ream; Tom Wong; Micky Minhas

(57) ABSTRACT

Computer-readable media, computer systems, and computing methods are provided for discovering applications using phone-number information. Initially, an application uploaded to an application marketplace is targeted. Phone numbers associated with the targeted application are discovered by identifying attributes of the targeted application from metadata associated therewith in the application marketplace, and identifying the phone numbers that reach at least one business affiliated with the targeted application or are relevant to the identified attributes of the targeted application. The associated phone numbers are mapped to the targeted application and maintained within an application manifest. Upon detecting user-initiated call-based operation(s) at a client device, the phone number(s) involved in the call-based operation(s) are compared against the application manifest to determine relevant applications. The relevant applications are distributed to the client device for presentation within a phone-number context, such as placing an outgoing call, receiving an incoming call, or reviewing a call-history log.

20 Claims, 8 Drawing Sheets

(56) References Cited

U.S. PATENT DOCUMENTS

| | | | |
|---|---|---|---|
| 2008/0263024 A1* | 10/2008 | Landschaft et al. | 707/5 |
| 2009/0043657 A1* | 2/2009 | Swift et al. | 705/14 |
| 2009/0234861 A1 | 9/2009 | Ramer et al. | |
| 2011/0105150 A1* | 5/2011 | Moon | H04W 4/001 455/456.3 |
| 2012/0008755 A1* | 1/2012 | Mittal | 379/93.01 |
| 2012/0021774 A1* | 1/2012 | Mehta et al. | 455/456.3 |

OTHER PUBLICATIONS

"ThePudding: Targeted Advertising Comes to Phone Calls", Retrieved on: Sep. 12, 2011, 3 pages, Available at: http://techcrunch.com/2007/09/24/thepudding-targeted-advertising-comes-to-phone-calls/.

"Google to Introduce Click-to-Call (Billing) in Ads on Mobile Devices", Retrieved on: Sep. 12, 2011, 9 pages, Available at: http://searchengineland.com/google-to-introduce-click-to-call-billing-in-ads-on-mobile-devices-32831?utm_usource=feedburner&utm_medium=feed&utm_campaign=Feed:+searchengineland+%28Search+Engine+Land%29.

"Android App Turns Phone Calls Into Interactive Social Media Exchanges", Retrieved on: Sep. 12, 2011, 9 pages, Available at: http://mashable.com/2011/04/20/innobell/.

"Thrutu: Multitasking While Calling on Your iPhone", Retrieved on: Sep. 12, 2011, 10 pages, Available at: http://itracki.com/2011/07120/thrutu-multitasking-calling-iphone/.

"HTC Droid Eris : Browsing Internet and Apps While on Call", Retrieved on: Sep. 12, 2011, 4 pages, Available at: http://androidforums.com/htc-droid-eris/32221-browsing-internet-apps-while-call.html.

* cited by examiner

SURFACING BUSINESS APPLICATIONS BASED ON CALLING ACTIVITIES

BACKGROUND

Recent trends have shown that there are more and more applications, or apps, created to fulfill users' tasks. Many of these apps are available at online locations, such as retail websites, in order to offer users an effortless app-shopping experience that may be customized for devices and/or scenarios. For example, various platforms (e.g., Apple®, Android®, and Microsoft®) have had exponential growth in their respective app stores and currently offer over 500,000 aggregate apps for their respective mobile devices. One such exemplary web-centric application is the Yelp® app—the counterpart application to the www.yelp.com website—that is customized to be installed on a variety of mobile devices.

Yet, along with this ever-expanding multitude of apps, there exists a discoverability problem. That is, popular or relevant applications are often hard to discover via online searches or other contexts where an app would prove useful. This discoverability problem stems from the standard search protocol of conventional search engines, which surface mainly websites, cards, and answers. This is true for both desktop and mobile devices.

With regard to mobile devices, there exist two primary user-initiated activities that have recently become predominate: placing calls and interacting with applications. Yet, these two activities are maintained separately and do not overlap with each other to enable new scenarios or new experience for the user. For instance, business-related incoming and outgoing calls are segregated from the user's quest for information (e.g., services and/or products) related to the business. By way of example, a user may be discussing a deal with a particular company, yet, the user is unable to track transactions or confirm a reservation with the business.

There exist applications with functionalities that would likely enhance the quality of most ongoing conversations, but these applications are undiscoverable during the course of those conversations. In one example, in the case of an outgoing call placed to book a rental car, there is presently no way for a user to browse available car models or get confirmation and pickup details if a reservation is made when the user is on the outgoing call. In another example, in the case of an incoming call received from an airline operator, there is presently no way for a user to track the status of a flight while conducting the incoming call, without the user manually performing a separate online search for the appropriate airline and filtering the search results for the appropriate flight.

Further, there are frequent times when it is easier for parties of a call to interact with the visual information rather than using voice. For example, when a user is picking a seat on a flight while talking with an airline operator, the typical methods of describing the positions of the available seats, selecting one or more of those seats, and writing down the selections prove to be much less efficient than trading visual information while talking. As such, embodiments of the present invention introduce technology for discovering apps relevant to a phone number of an incoming, outgoing, and/or ongoing call and allowing parties to the call to establish a connection over the app during the course of the call.

SUMMARY

This Summary is provided to introduce a selection of concepts in a simplified form that are further described below in the Detailed Description. This Summary is not intended to identify key features or essential features of the claimed subject matter, nor is it intended to be used in isolation as an aid in determining the scope of the claimed subject matter.

Embodiments of the present application introduce technology for discovering applications that relate to one or more phone numbers and for integrating those applications within a phone-number context. The terms "applications" and "apps" are used interchangeably herein and broadly pertain to application software designed to be executed by an operating system hosted on a computing device and to assist the user in performing a singular or multiple-related specific task. In operation, apps provide digital solutions in the real world, such as word processing, gaming, communication-based interfaces, etc. Examples of apps include enterprise software, accounting software, office suites, graphics software, and media players. It should be understood and appreciated that the definition of apps is not limited to the scope of examples provided herein and may include any code that carries out one or more operations when executed.

Initially, embodiments of the present invention involve building and maintaining a registry of apps that may be mapped in some manner to phone numbers. This registry may be persisted in a data store and indexed via an application manifest, which is accessible to search engine(s), front-end components (e.g., for selecting applications relevant to a phone-number context), and back-end components (e.g., for updating a mapping between the applications and phone numbers). Various attributes of an application may be used to map the phone numbers to the application. Further, various characteristics of a phone-number context may be used to retrieve applications that are deemed relevant to the user that has entered the phone-number context. As used herein, the phrase "phone-number context" is not meant to be limiting, but may encompass any situation in which a user of a client device accesses, views, interacts with, or even is likely to consider a phone number. By way of example, a phone-number context may involve the user placing an outgoing call, the user receiving an incoming call, the user reviewing a call-history log, or the user accessing an online directory.

The attributes used to map phone numbers with applications may vary and include any information related to the application that is made available. In one instance, an attribute of an application may be the web address, uniform resource locator (URL), or a uniform resource identifier that directs a user to a website or web page associated with the application. In another instance, the attribute of the application may include the content within the website or web page associated with the application.

In yet another instance, attributes of the application may be extracted from the application's title, description, and/or metadata that is linked to the application (e.g., submitted with the application when being uploaded to an application marketplace by a developer). That is, in embodiments, terms or phrases from content of a web page may be applied to discover relevant phone numbers for a subject application, as opposed to simply discovering just those phone numbers that are explicitly correlated with the application.

Upon detecting the user entering a phone-number context (e.g., conducting a call event or reviewing a listing of phone numbers), a front-end component is enabled to extract the phone numbers relevant to the phone-number context and compare the relevant phone numbers against the application manifest in order to discover valid applications. Although the interaction between the front-end component and the application manifest, described in more detail below, is provided as an exemplary embodiment throughout, other embodiments of the present invention contemplate leveraging differing technologies for discovering relevant applications. By way of example, a protocol that operates similarly to a domain name server (DNS) technology may be utilized for locating, downloading, and installing applications on the user's device. In this case, the protocol employs information drawn from a phone number, or an underlying website of the phone number, to conduct an online search for relevant applications (e.g., app database, app catalogue, or app store), or perform a local search within an inventory of installed applications on the user's device.

Upon identifying a group of relevant applications, these applications may be ranked according to any metrics that can be used to sort and/or organize information. Generally, ranking involves ranking applications in relation to other applications using such metrics as popularity of the applications, where popularity may be derived from various sources. These sources used for ranking may include specific services, such as social networks, recommendations from other users, crowd-source ratings, and reviews. Upon establishing the ranking, the number of applications may be limited based on one or more criteria, thereby displaying only the highest ranked applications (e.g., increased level of relevance). In one instance, the limiting criteria involves the amount of available area within a call screen that is allocated for presenting applications. In another instance, the limiting criteria involves a determination whether the highest ranked applications are related to data within a user profile that is compiled upon monitoring actions taken by the user of the client device.

The highest ranked applications are then placed, or embedded, within a call screen, contact listing, call log, or any other phone-number context. In one embodiment, placement involves presenting a representation of the application proximate to a contact's phone number that has parity with the application in order to indicate to the user the rationale for selecting the application. In another embodiment, placement involves exposing the application in a pop-up window on top of a call screen to indicate another party of an ongoing call has suggested the exposed application. Other embodiments are described herein, which provide non-limiting examples of schemes for surfacing the applications to a user on a GUI.

Upon detecting a user-initiated selection of the application within the displayed search results, one or more actions may occur. For instance, if the application is not recognized as residing within the inventory of the user's device, the search engine may navigate the user to an application store, thereby prompting the user to purchase the relevant application. However, if the application is recognized as being listed in the device's inventory (i.e., previously installed on the device), the search engine may automatically launch the application. In this way, the user is saved the steps of manually locating and starting the application. In an exemplary embodiment, these actions may be offered as options (e.g., control buttons) that are visually presented near a representation of the application that is surfaced within the search results.

In the instance that the application is launched from the search results, context of the user's phone call may be passed from the front-end component to the application for current or future use. This context may be passed as parameters that represent various aspects of the user's phone call, such as subject of the phone call. By way of example, an airline operator that is assisting a user attempting to book a flight may provide parameters that bring a launched or nonlaunched application (e.g., Southwest® app) to an entry point (e.g., available seats on the flight being booked) that is ostensibly relevant to the user's overarching intent (i.e., planning a trip) of the phone call.

BRIEF DESCRIPTION OF THE DRAWINGS

Embodiments of the invention are described in detail below with reference to the attached drawing figures, wherein.

DETAILED DESCRIPTION

Figure 1:
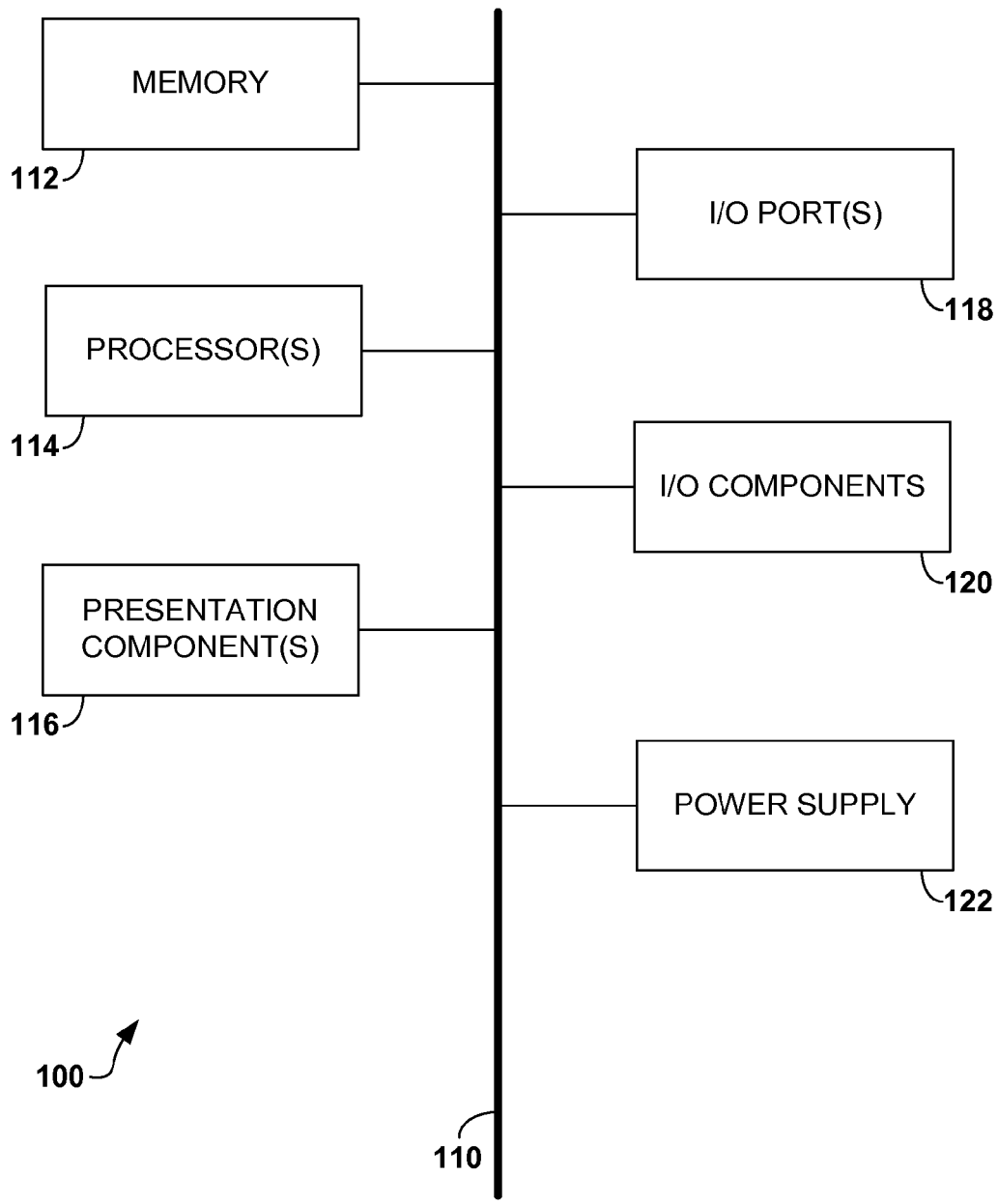
FIG. 1 is a block diagram of an exemplary computing device suitable for implementing embodiments of the invention.

The subject matter of embodiments of the invention disclosed herein is described with specificity to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies.

The present invention introduces technology for discovering and surfacing business apps implicitly using information drawn from call-based user interactions with a client device. Further, the business apps are discovered and surfaced within the flow of calling activity such that their presence intuitively informs the user of their availability. In one instance, the technology of the present invention, in embodiments, employs a reverse phone-number lookup that locates and displays apps using phone number(s) for the particular business that is a party to a call event. In operation, upon the user making a call, receiving a call, or entering a phone-number context (e.g., viewing a contact listing), the system recommends apps based on phone numbers relevant to the call event or context. During or after the call event or context, the user can either download these apps or launch them directly if they have already been purchased.

Accordingly, one embodiment of the present invention may involve computer-readable media that support the operations of computer-executable instructions thereon. When executed, the computer-executable instructions may perform a method for surfacing one or more applications as a function of at least one phone number. In embodiments, the method involves receiving a phone number from a client device and using the phone number to aggregate an initial set of applications that are predetermined to be associated with the phone number. One or more applications may be determined from the initial set of applications as a function of one or more criteria. In one instance, the criteria include a user profile compiled upon monitoring actions taken by a user of the client device, such that selecting the applications comprises sorting the initial set of applications based on their respective relevance to data stored within the user profile. In another instance, the criteria include an amount of available area that exists within a call screen to present the selected applications, such that selecting the applications comprises limiting a number of the initial set of applications being selected based on the available area. Upon selecting the applications, the selected applications are distributed for presentation on a user-interface (UI) display rendered by the client device.

In an embodiment where the phone number represents an outgoing call number, presenting the selected applications on the UI display involves presenting an indicia of the selected applications within a call screen displaying the outgoing call number. In another embodiment where the phone number represents an incoming call number, presenting the selected applications on the UI display involves presenting an indicia of the selected applications within a call screen displaying the incoming call number. In yet another embodiment where the phone number represents an entry in a call-history log, presenting the selected applications on the UI display involves integrating an indicia of the selected applications within the call-history record. In still another embodiment where the phone number represents an entry in a user's contact list, presenting the selected applications on the UI display involves integrating an indicia of the selected applications within the user's contact list.

In another embodiment of the present invention, a computer system is established and configured for selecting one or more applications using at least one phone number. Initially, the computer system includes a data store and a server. In one instance, the data store is configured for maintaining an application manifest comprising a listing of applications mined from an application marketplace. Typically, the applications within the listing are mapped to phone numbers. In another instance, the server includes a processing unit coupled to a computer readable-medium, where the computer-readable medium is associated with a plurality of computer software components executable by the processing unit.

In an exemplary embodiment, the computer software components involve a back-end component and a front-end component. The back-end component is employed for mapping the phone numbers to the applications based, in part, on one or more attributes of the applications. The front-end component is configured for detecting whether a user has entered a phone-number context on a client device, for extracting the phone number from the phone-number context, for comparing the phone number against the listing of applications within the application manifest to identify the applications that correspond with the phone number, and for communicating the identified applications to a client device for presentation to a user thereof. As explained above, the phone-number context represents the user placing an outgoing call, the user receiving an incoming call, the user reviewing a call-history log, and/or the user accessing an online directory.

In yet another embodiment of the present invention, a computerized method is provided for mapping the candidate phone numbers to a targeted application. Initially, the computerized method may be carried out by a front-end component interacting with a back-end component running on at least one processor. The method involves targeting an application for association with a phone number and determining candidate phone numbers to be associated with the targeted application. In one instance, the process of determining involves the following steps: distilling attributes of the targeted application from metadata linked to the targeted application within an online catalogue; and identifying the candidate phone numbers that reach at least one business affiliated with the targeted application or are relevant to the distilled attributes of the targeted application. The method may continue by mapping the candidate phone numbers to the targeted application and employing the back-end component to maintain the mapping within an application manifest that is accessible by the front-end component upon detecting a user-initiated call-based operation at a client device.

Having described an overview of embodiments of the present invention, an exemplary operating environment in which embodiments of the present invention may be implemented is described below in order to provide a general context for various aspects of the present invention.

The following discussion describes various embodiments of the present invention. Note that several of the exemplary embodiments described below are based on current applications to make the discussion more concrete. However, aspects of the present invention should not be construed as being limited to a particular application or platform that offers the particular application. That is, embodiments of the present invention may be designed to be applied to differing platforms (e.g., including PC, iPhone®, and Microsoft Windows®) and other various implementations of an application marketplace.

Referring initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that performs particular tasks or implements particular abstract data types. The invention may be practiced in a variety of system configurations, including handheld devices, consumer electronics, general-purpose computers, more specialty computing devices, etc. The invention may also be practiced in distributed computing environments where tasks are performed by remote-processing devices that are linked through a communications network.

With reference to FIG. 1, computing device 100 includes a bus 110 that directly or indirectly couples the following devices: memory 112, one or more processors 114, one or more presentation components 116, input/output (I/O) ports 118, input/output components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "handheld device," etc., as all are contemplated within the scope of FIG. 1 and reference to "computing device."

Computing device 100 typically includes a variety of computer-readable media. Computer-readable media can be any available media that can be accessed by computing device 100 and includes both volatile and nonvolatile media, removable and nonremovable media. By way of example, and not limitation, computer-readable media may comprise computer storage media and communication media. Computer storage media include both volatile and nonvolatile, removable and nonremovable media implemented in any method or technology for storage of information such as computer-readable instructions, data structures, program modules, or other data. Computer storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium, which can be used to store the desired information and which can be accessed by computing device 100. Communication media typically embody computer-readable instructions, data structures, program modules, or other data in a modulated data signal such as a carrier wave or other transport mechanism and include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared and other wireless media. Combinations of any of the above should also be included within the scope of computer-readable media.

Memory 112 includes computer-storage media in the form of volatile and/or nonvolatile memory. The memory may be removable, nonremovable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc.

I/O ports 118 allow computing device 100 to be logically coupled to other devices including I/O components 120, some of which may be built in. Illustrative components include a microphone, joystick, game pad, satellite dish, scanner, printer, wireless device, etc.

Figure 2:
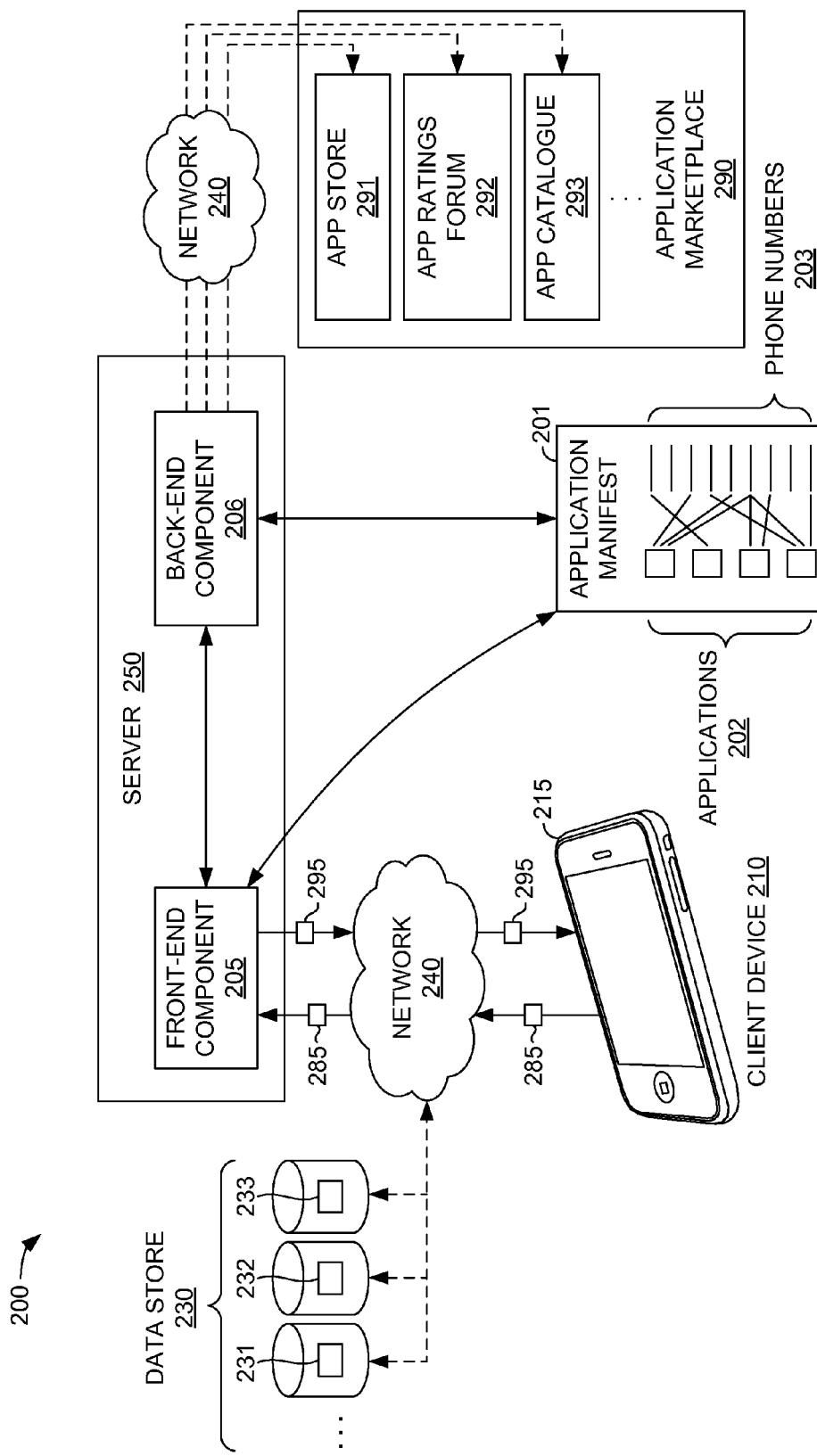
FIG. 2 is a block diagram of an exemplary system architecture of a distributed computing environment configured for use in implementing embodiments of the present invention.

Technology, introduced by embodiments of the present invention, for automatically discovering apps relevant to phone numbers and surfacing on a UI display representation(s) of the relevant apps as part of a phone-number context will now be discussed with reference to FIG. 2. In particular, FIG. 2 depicts a block diagram that illustrates an exemplary system architecture 200 of a distributed computing environment, suitable for use in implementing embodiments of the present invention. Generally, implementing embodiments of the present invention relate to building a phone-number-to-app mapping within an application manifest 201, discovering apps in response to a user entering a phone-number context using the application manifest 201, and presenting those apps to a user within various calling experiences. It should be understood and appreciated that the exemplary system architecture 200 shown in FIG. 2 is merely an example of one suitable computing environment and is not intended to suggest any limitation as to the scope of use or functionality of the present invention. Neither should the exemplary system architecture 200 be interpreted as having any dependency or requirement related to any single component or combination of components illustrated therein.

Initially, the exemplary system architecture 200 includes an application manifest 201, a client device 210, data stores 230, a server 250, an application marketplace 290 and a network 240 that interconnects each of these items. Each of the client device 210, the data stores 230, the server 250, and the application marketplace 290 shown in FIG. 2, may take the form of various types of computing devices, such as, for example, the computing device 100 described above with reference to FIG. 1. By way of example only and not limitation, the client device 210 and/or the server 250 may be a personal computer, desktop computer, laptop computer, consumer electronic device, handheld device (e.g., personal digital assistant), various servers, processing equipment, and the like. It should be noted, however, that the invention is not limited to implementation on such computing devices but may be implemented on any of a variety of different types of computing devices within the scope of embodiments of the present invention.

Typically, each of the devices 210 and 250 includes, or is linked to, some form of computing unit (e.g., central processing unit, microprocessor, etc.) to support operations of the component(s) running thereon (e.g., front-end component 205, back-end component 206, and the like). As utilized herein, the phrase "computing unit" generally refers to a dedicated computing device with processing power and storage memory, which supports operating software that underlies the execution of software, applications, and computer programs thereon. In one instance, the computing unit is configured with tangible hardware elements, or machines, that are integral, or operably coupled, to the devices 210 and 250 to enable each device to perform communication-related processes and other operations (e.g., accessing the data store 230 or discovering apps 202 within the application manifest 201). In another instance, the computing unit may encompass a processor (not shown) coupled to the computer-readable medium accommodated by each of the devices 210 and 250.

Generally, the computer-readable medium includes physical memory that stores, at least temporarily, a plurality of computer software components that are executable by the processor. As utilized herein, the term "processor" is not meant to be limiting and may encompass any elements of the computing unit that act in a computational capacity. In such capacity, the processor may be configured as a tangible article that processes instructions. In an exemplary embodiment, processing may involve fetching, decoding/interpreting, executing, and writing back instructions.

Also, beyond processing instructions, the processor may transfer information to and from other resources that are integral to, or disposed on, the devices 210 and 250. Generally, resources refer to software components or hardware mechanisms that enable the devices 210 and 250 to perform a particular function. By way of example only, the resources accommodated by the server 250 may include one or more of the following: the front-end component 205 and the back-end component 206.

The client device 210 may include an input device (not shown) and a presentation device 215. Generally, the input device is provided to receive input(s) affecting, among other things, a presentation of the relevant applications 295 surfaced at a UI display in response to detecting phone-number information 285. Illustrative devices include a mouse, joystick, key pad, microphone, I/O components 120 of FIG. 1, or any other component capable of receiving a user input and communicating an indication of that input to the client device 210. By way of example only, the input device facilitates entry of a phone number into the client device 210 for placing an outgoing call.

In embodiments, the presentation device 215 is configured to render and/or present the UI display thereon. The presentation device 215, which is operably coupled to an output of the client device 210, may be configured as any presentation component that is capable of presenting information to a user, such as a digital monitor, electronic display panel, touchscreen, analog set top box, plasma screen, audio speakers, Braille pad, and the like. In one exemplary embodiment, the presentation device 215 is configured to present rich content, such as the browser window that includes a display area populated with representations of applications 295 (e.g., digital images). In another exemplary embodiment, the presentation device 215 is capable of rendering other forms of media (e.g., audio signals). In yet another exemplary embodiment, the presentation device 215 may present the applications 295 as icons integrated within a call screen, as more fully discussed below.

The data store(s) 230 are generally configured to store information associated with a ranking application for selection prior to presentation, as discussed below. In various embodiments, such information may include, without limitation, recorded user behavior 231 of society in general, a log 232 of a particular user's tracked interactions (e.g., user profile), and other information 233 that pertains to embodiments of the present invention. In addition, the data store(s) 230 may be configured to be searchable for suitable access of the stored information. It will be understood and appreciated by those of ordinary skill in the art that the information stored in the data store(s) 230 may be configurable and may include any information relevant to the selection of apps with respect to phone numbers. The content and volume of such information are not intended to limit the scope of embodiments of the present invention in any way. Further, though illustrated as single, independent components, the data store(s) 230 may, in fact, be a plurality of databases, for instance, a database cluster, portions of which may reside on the client device 210, the server 250, another external computing device (not shown), and/or any combination thereof.

This exemplary system architecture 200 is but one example of a suitable environment that may be implemented to carry out aspects of the present invention and is not intended to suggest any limitation as to the scope of use or functionality of the invention. Neither should the illustrated exemplary system architecture 200 be interpreted as having any dependency or requirement relating to any one or combination of the client device 210, the data stores 230, the server 250, the application marketplace 290, and components 205 and 206, as illustrated. In some embodiments, one or more of the components 205 and 206 may be implemented as stand-alone devices. In other embodiments, one or more of the components 205 and 206 may be integrated directly into the server 250, or on distributed nodes that interconnect to form the server 250. It will be understood by those of ordinary skill in the art that the components 205 and 206 (illustrated in FIG. 2) are exemplary in nature and in number and should not be construed as limiting.

Accordingly, any number of components may be employed to achieve the desired functionality within the scope of embodiments of the present invention. Although the various components of FIG. 2 are shown with lines for the sake of clarity, in reality, delineating various components is not so clear, and, metaphorically, the lines would more accurately be grey or fuzzy. Further, although some components of FIG. 2 are depicted as single blocks, the depictions are exemplary in nature and in number and are not to be construed as limiting (e.g., although only one presentation device 215 is shown, many more may be communicatively coupled to the client device 210).

Further, the devices of the exemplary system architecture may be interconnected by any method known in the relevant field. For instance, the server 250 and the client device 210 may be operably coupled via a distributed computing environment that includes multiple computing devices coupled with one another via one or more networks 240. In embodiments, the network 240 may include, without limitation, one or more local area networks (LANs) and/or wide area networks (WANs). Such networking environments are commonplace in offices, enterprise-wide computer networks, intranets, and the Internet. Accordingly, the network is not further described herein.

In operation, the components 205 and 206 are designed to perform a process that includes, at least, the steps of discovering phone numbers that are relevant to applications and pushing the applications to the client device 210. Initially, as illustrated in FIG. 2, the application manifest 201 typically includes a mapping between relevant apps 202 and phone numbers 203. These phone numbers 203 may be identified as being relevant to any attributes of the apps 202 and may be digitally linked to those apps 202 for future discovery, as more fully discussed below.

In embodiments, the back-end component 206 is responsible for constructing and maintaining the application manifest 201 by discovering phone numbers that are relevant to apps. Presently, application catalogues do not include information about phone numbers that would be associated with apps. That is, phone numbers are not provided in the app metadata by the business/developer when they register apps with the application marketplace 290, thus, no explicit association is presently readily available. Accordingly, the back-end component 206 employs implicit information to create a logical mapping between the phone numbers 203 and the apps 202 within the application manifest 201.

In one instance of creating the logical mapping by way of constructing the application manifest 201, the back-end component 206 is equipped to crawl the application marketplace 290 for available apps 202 and associating the apps 202 with phone numbers 203 using attributes of the apps 202. Crawling the application marketplace 290 may comprise mining applications from such sources as an app store 291, an app ratings forum 292, and/or an app catalogue 293. It should be understood and appreciated that other sources for accessing applications may be used, and the illustrated sources 291-293 do not represent an exhaustive listing. Further, the application marketplace 290 may vary based on an applications platform (e.g., Microsoft® Apps, Android®, and the like) running on the client device 210.

Constructing the mapping between the apps 202 and the phone numbers 203 may involve defining attributes or distilling properties of particular apps in an implicit manner. For instance, the back-end component 206 may identify the businesses that are associated with a subject application (e.g., own/developed the app or relevant/context to the app) and, at some later time, identify the phone numbers (e.g., local and/or national) associated with the businesses. By way of example, identifying businesses may involve performing a local directory lookup to discover the phone number(s) linked to the app. The local directory lookup may find the phone numbers associated with the national business and/or the local franchise itself. In instances, the local directory lookup may represent the act of accessing and examining a nonresidential phone-listing (e.g., Yellow Pages) to scan the known URLs of apps against phone numbers to find the relevant phone numbers 203.

In another embodiment of discovering phone numbers, a mechanism may be employed by the back-end component to read the text/content of the web pages at the URLs associated with apps to extract potential/candidate phone numbers. For example, when a business website ULR is predetermined to be associated with an app, the mechanism mines/crawls the website to discover and extract phone numbers (e.g., customer service number) which can be used to invoke a particular app. Thus, many phone numbers 203 may be attached to an app 202 within the application manifest 201. In one instance, competitor pizza companies numbers can be attached to a particular pizza establishment if a website linked to a ratings app includes a directory of various pizza listings within a specific region. In another instance, advertisers relevant to the particular pizza establishment (e.g., Urbanspoon or Yelp) may pay to have their apps presented in context of other phone numbers that dial/contact certain businesses.

Although no format presently exists for developers to indicate relevant phone numbers when submitting apps to the application marketplace 290, embodiments of the present invention contemplate the future capability of developers to specify phone numbers when submitting/registering the app with a catalogue of the application marketplace 290. For instance, a UI that is generated for accepting new apps to the application marketplace 290 may include an entry space designated for accepting relevant phone numbers. In this scenario, the back-end component 206 is enabled to realize the explicit association between the specified phone number and app by reading the metadata of the app. The explicit association may be used to create a new logical mapping within the application manifest 201 or to validate a predefined logical mapping.

Upon establishing the logical mapping within the application manifest 201, the apps 202 may be associated with a ranking. Generally, the ranking is useful when multiple applications 202 may be potentially returned for a certain phone number 203 after the front-end component 205 performs a lookup. In one instance, the calling mode may be employed for statically (prior to detecting a calling event) or dynamically (in response to a calling event) ranking the applications 202. The "calling mode" substantially relates to the phone-number context in which the user is operating. In one example, the calling mode assists with ranking the applications 202 upon receiving an incoming phone call. In this example, the calling mode may direct one or more of the components 205 and 206 to rank apps highly that help the user decide whether to pick up the incoming call.

In another example, the calling mode assists with ranking the applications 202 upon placing an outgoing phone call. In this example, the calling mode may direct one or more of the components 205 and 206 to rank apps highly that provide the user information about the business being contacted (e.g., apps that show flight information when calling an airline operator) or about items of interest surrounding the business (e.g., apps that relate to parking lots, travel conditions, reservations, and the like when patronizing a restaurant). In a related example, the calling mode may cause location information to be ranked highly when placing an outgoing call to a residential number (e.g., local news for that area code). In yet another example, the calling mode assists with ranking the applications 202 upon reviewing a call-history listing (see FIG. 4). In this example, the calling mode may direct one or more of the components 205 and 206 to rank apps highly that relate to a latest interaction with the entity reachable by the entry within the call-history listing.

Although various criteria for ranking apps 202 within the application manifest 201 have been discussed, it should be appreciated and understood that other characteristics of the apps 202 or events occurring at the client device 210 may be used to rank the applications 202. In one instance of using app characteristics, the applications 202 may be ranked based on general popularity of all users and/or specific popularity with an individual user. In another instance of using app characteristics, companies may submit bids that attach to the applications 202 as characteristics. These bids drive surfacing certain applications upon a particular phone number being displayed at the UI display. This estimate-based surfacing of apps within the mobile-app market allows apps with high bids to be ranked highly, thus, generating revenue for a service provider maintaining the application manifest 201.

Upon establishing the application manifest 201, as well as a ranking therein, the front-end component 205 may employ the application manifest 201 to select apps 295 from the application manifest 201 using phone-number information 285, and to integrate the selected apps 295 into various calling experiences. For instance, the front-end component 205 may push the selected apps 295 from the server 250 to the client device 210 differently based on the stage of call event: call-start, call-connected, call-ended. In operation, an underlying application or portion of the OS on the client device 210 may listen to changes within the call event and make web-browser service calls to retrieve apps corresponding to a subject phone number 285 in conjunction with the current stage of the calling event with that subject phone number 285. In one example, when the user picks up a call, a first app may be selected and displayed and, if already downloaded, may be launched to the proper entry point showing relevant content (e.g., weekly sale on pizza when the phone number of the call relates to a pizza establishment). Yet, when the user ends the call, a second app may be selected that is relevant to the phone number of the call, part of an ad campaign that is targeting the phone number, etc. By way of example, during an ongoing call with Papa John's, there may be an app related to ordering pizza at Papa John's pushed to the client device 210. However, upon ending the call, there may be an app sponsored by Dominoes' Pizza, who is running a promotion that surfaces their competing app that encourages the user to call them next time.

In an exemplary embodiments, some mechanisms running on client device 210 may detect calling-events and will generate a service call to the front-end component 205 by passing the phone-number information 285 from the phone-number context. The front-end component 205 returns the apps 295 selected upon matching the phone-number information 285 with the application manifest 201. Further, the front-end component 205 may filter the selected apps 295 using such criteria as user preferences (e.g., whether the user purchases apps or typically downloads free apps), user behavior (e.g., if the user is a Opentable® user, then show the corresponding app), screen-availability constraints of the UI display, and/or which apps are presently installed on the client device 210.

Figure 3:
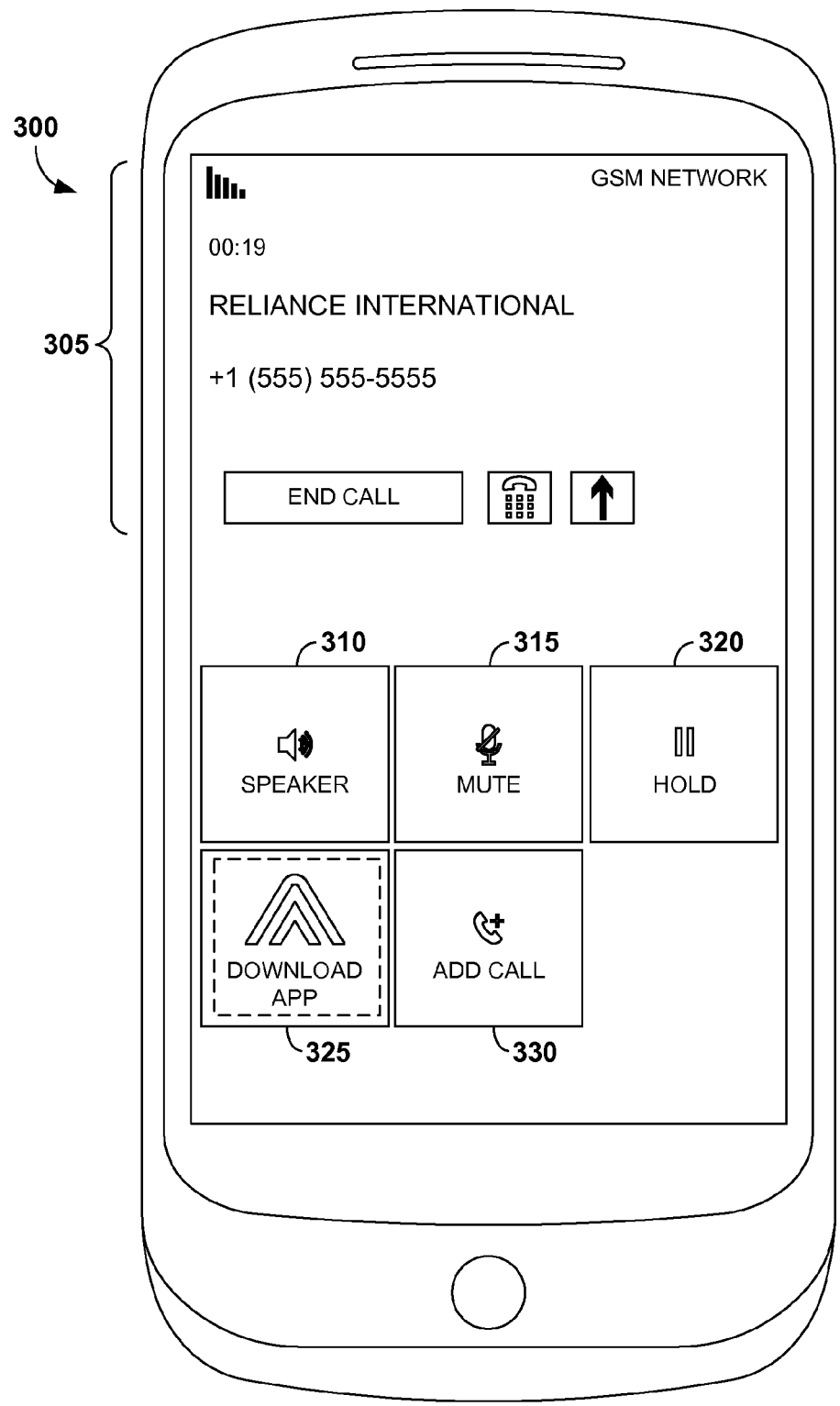
FIG. 3 is a schematic diagram depicting a first illustrative UI display that includes a representation of applications surfaced concurrently with an incoming call, in accordance with embodiments of the invention.
Figure 4:
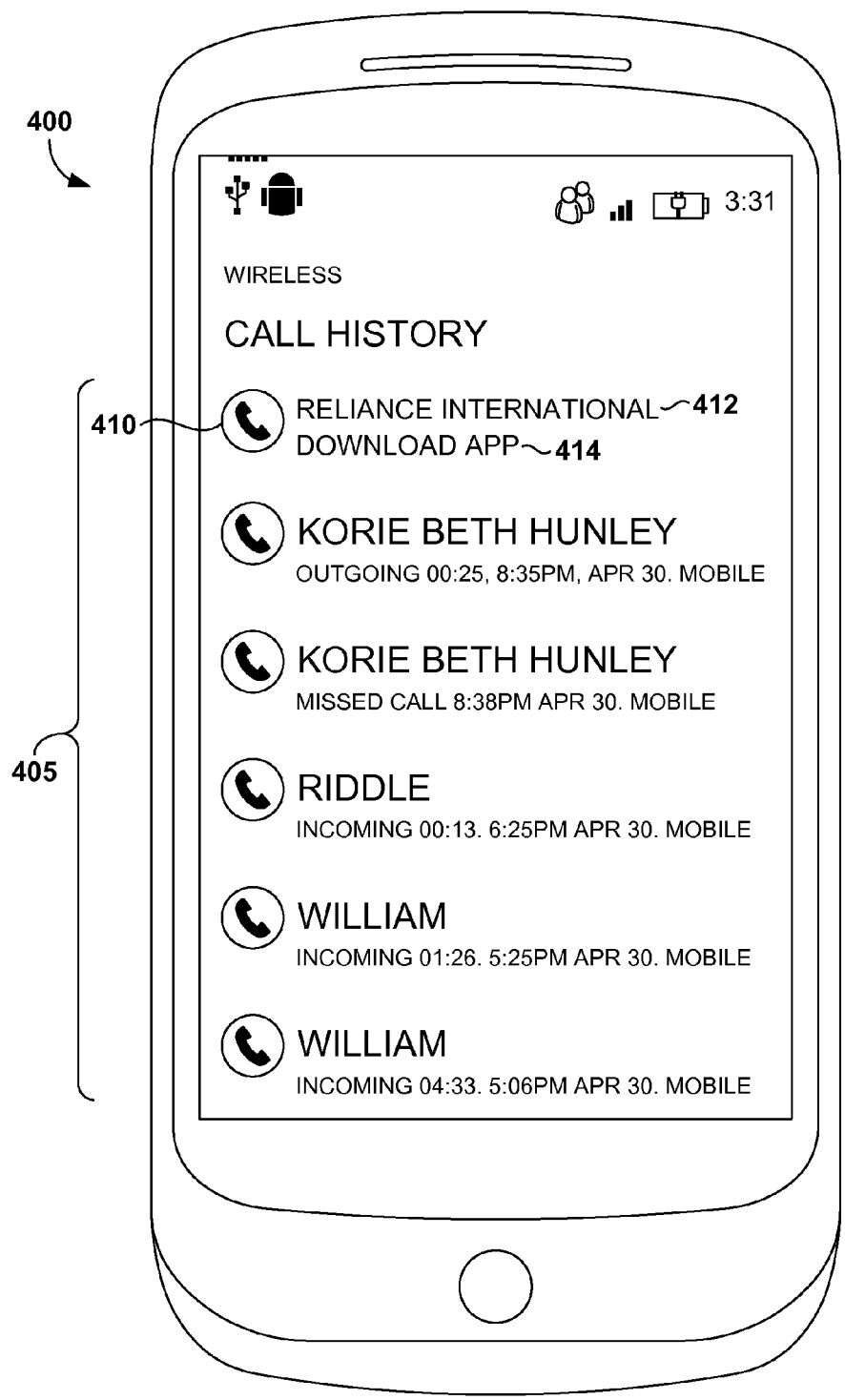
FIG. 4 is a schematic diagram depicting a second illustrative UI display that includes a representation an application surfaced proximate an entry within a call-history listing, in accordance with embodiments of the invention.
Figure 5:
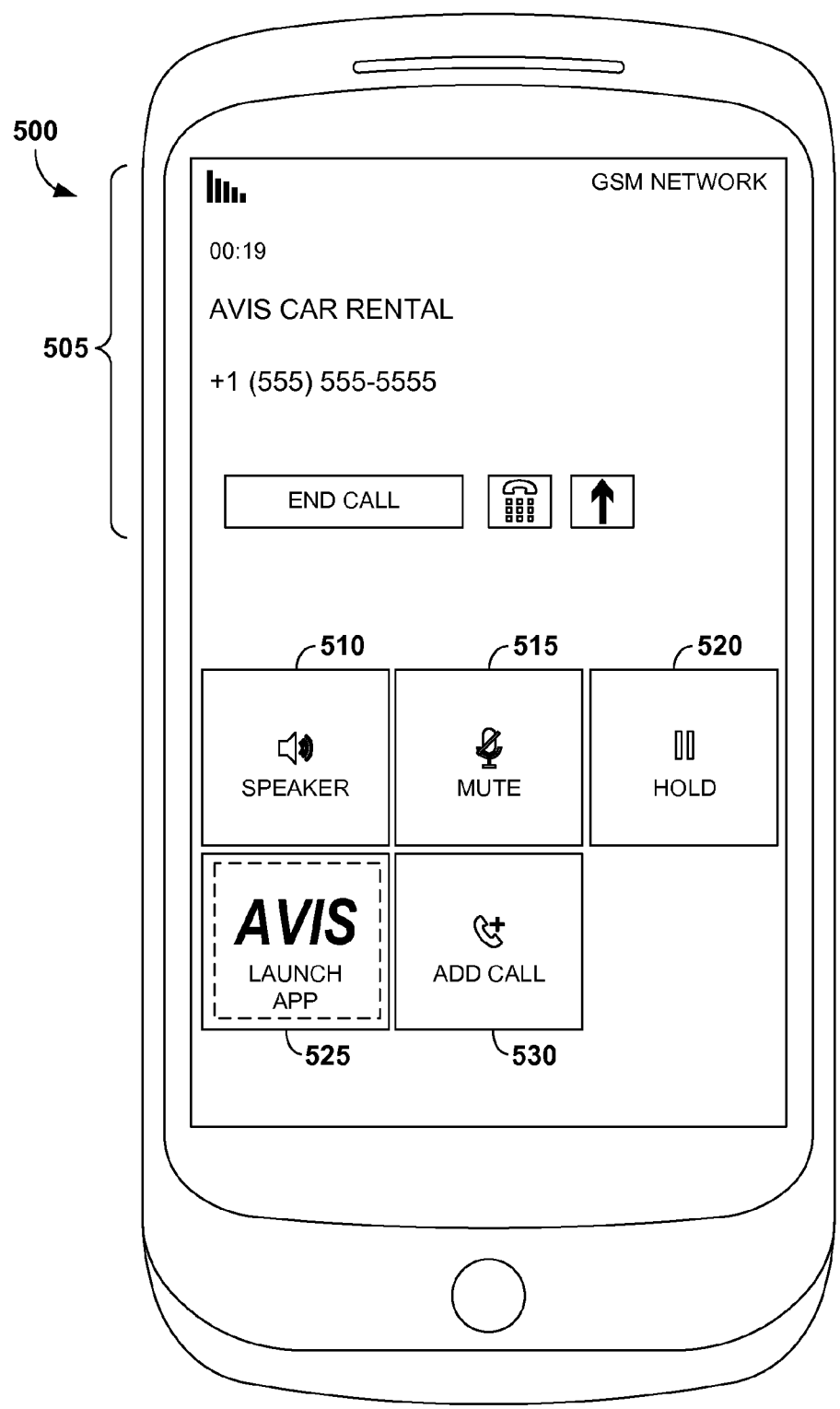
FIG. 5 is a schematic diagram depicting a third illustrative UI display that includes a representation of applications surfaced concurrently with an outgoing call, in accordance with embodiments of the invention.

Turning now to FIGS. 3-5, a discussion of ways to surface the selected apps 295 within a UI display will now commence. Initially, FIG. 3 represents a schematic diagram depicting a first illustrative UI display 300 that includes a representation of application(s) 325 surfaced concurrently with an incoming call 305, in accordance with embodiments of the invention. As shown, a representation of the application 325 is displayed in an integrated manner with operational keys 310, 315, 320, and 330 on the call screen. As depicted, an icon overlying the representation of the application 325 visually associates the application 325 with the context of the incoming call 305 such that the user understands why the application 325 is being presented. Further, the representation of the application 325 may include the functionality of a control button that launches or downloads the application 325 upon receiving a user-initiated selection action (e.g., single or double click).

Turning now to FIG. 4, a schematic diagram depicting a second illustrative UI display 400 that includes a representation of an application 414 surfaced proximate an entry 410 within a call-history listing 405 is shown, in accordance with embodiments of the invention. The call-history listing 405 (e.g., phone contacts) includes various entries. Those entries that have a phone number mapped to an application within the application manifest 201 of FIG. 2 are considered candidates for invoking the front-end component 205 to surface an application proximately thereto. One benefit of surfacing the application near the relevant entry, such as the positional relationship between the application 414 and the description 412 of the entry 410, is the ability to convey the context of why an app is being shown. In this way, the front-end component 205 is able to link contextual application(s) with individual call-history entries.

Further, a click-event applied at the application 414 may navigate the user to an online location downloading the application 414. Or, a click-event applied at the application 414 may launch the application 414 if the user has already downloaded it to the client device 210, thereby providing the ability to launch apps directly from a call-history listing 405.

With reference to FIG. 5, a schematic diagram depicting a third illustrative UI display 500 that includes a representation of application(s) 525 surfaced concurrently with an outgoing call 505 is shown, in accordance with embodiments of the invention. Similar to FIG. 3, the application 525 is selected because it is relevant to the phone number of the phone-call context (e.g., outgoing call). Yet, different considerations may be employed during selection due to the difference in call mode between FIG. 3 (incoming call) and FIG. 5 (outgoing call).

Figure 6:
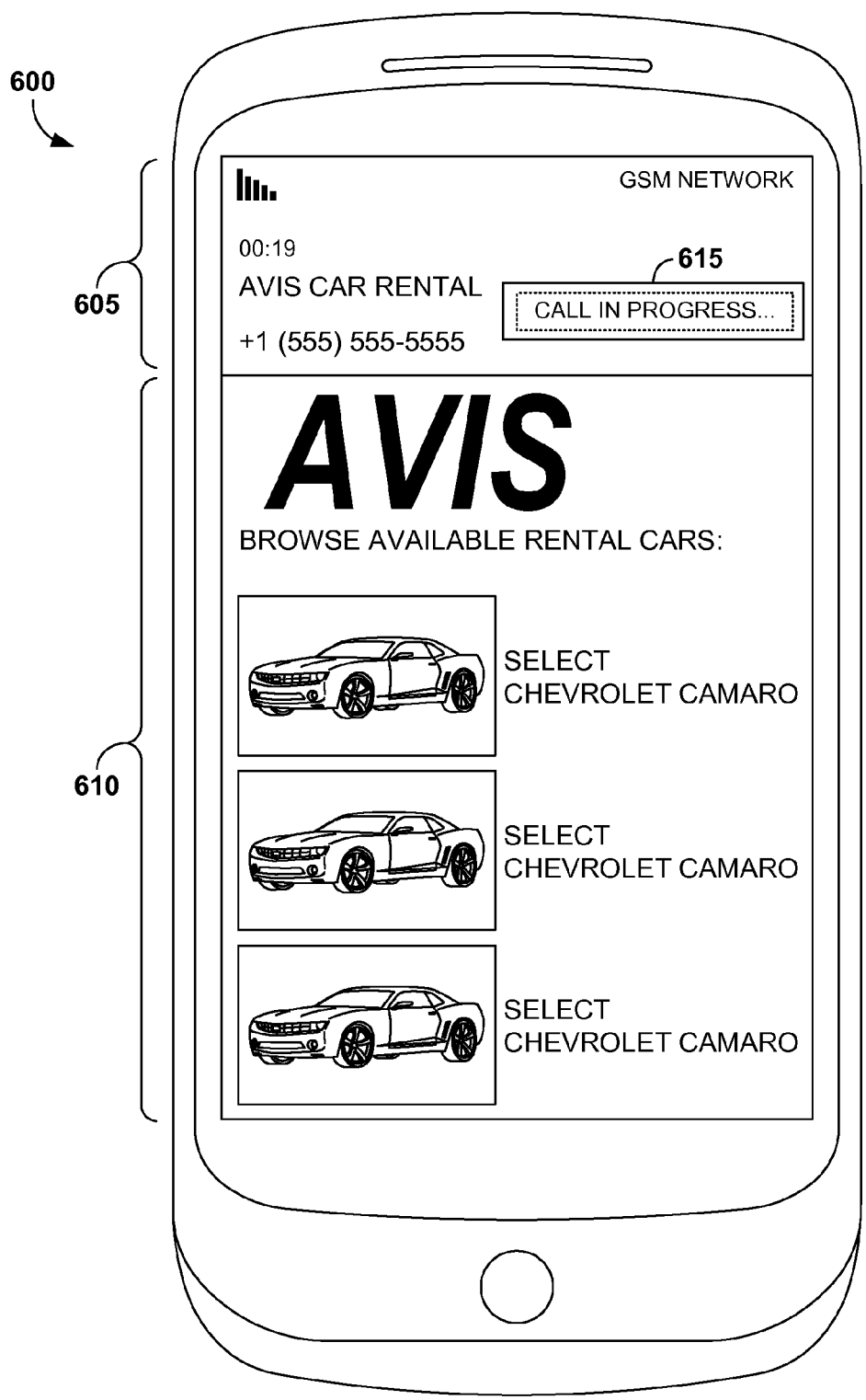
FIG. 6 is a schematic diagram depicting a fourth illustrative UI display that includes a representation of an application that is launched to an entry point relevant to the ongoing call, in accordance with embodiments of the invention.

Further, if the user has the application 525 previously installed, selection of the representation of the application 525 may trigger the application 525 to launch during the outgoing call, as shown in FIG. 6. Generally, FIG. 6 represents a schematic diagram depicting a fourth illustrative UI display 600 that includes a representation of the application 525 that is launched to an entry point relevant to the ongoing call 605, in accordance with embodiments of the invention. As depicted by the notice 615, the ongoing call 605 is in progress while the application 525 is launched and receiving interactions from the user. In an exemplary embodiment, the application 525 is launched to an entry point 610 that is relevant to the ongoing call 605.

Because the application 525 is able to launch to the appropriate entry point 610 concurrently with the ongoing call 605, the calling party and/or receiving party are allowed to pass data and visual information in the same session as the ongoing call 605 (i.e., continuing a conversation while interfacing with the application 525). Thus, business being transacted over the phone is reflected in the app. With reference to the example illustrated in FIG. 6, when a user is reserving a rental car for an upcoming vacation, the customer-service representative at the rental-car agency, who is potentially speaking to the user over the ongoing call 605, may push the list of available cars to the user in real-time. The available cars may be displayed as selectable options that allow the user to dynamically chose a style of car while remaining on the call. Accordingly, by interacting via the application 525, the parties to the ongoing call 605 can share information via a same channel (e.g., dynamic interchange via a data bridge) in a central server that is supporting the ongoing call 605.

In one instance, the application 525 may be configured to be aware whether the user is interfacing with another party via the ongoing call 605. In this instance, the application 525 may automatically create a specialized UI for conveying/exchanging information in real-time between parties on the ongoing call 605 (e.g., real-time data-push session during a call). That is, the application 525 automatically switches between modes upon recognizing the user is on the ongoing call 605 via a monitoring mechanism of the operating system on the client device 210. Thus, interaction can occur concurrently over both the call (voice) and the app (visual media or data content).

In embodiments of establishing the concurrent interaction, an IP session of the application 525 may be invoked during the ongoing call 605 in order to provide a destination for the pushed information. For instance, the application 525 may inform the parties to the IP session of the phone number that is associated with the IP session such that the notifications are sent to the respective phone numbers, which, in turn, drive content of the application 525. For example, if the calling party has the application 525 installed, on the other end, the receiving party knows the calling number, a sender notification is pushed to the calling number. The sender notification is consumed by the application on the calling-party side incident to connection over the appropriate channel within a central server. In another example, the concurrent interaction may be invoked upon conducting the following steps: an app intercepting a calling number; consuming the calling number at the app; using the calling number to link or synchronize the devices on the call such that inputs to one app can drive the current state of the other app. Accordingly, this technique for tying together the voice channel (e.g., phone number) and the data channel (e.g., user login, device ID, IP address, and the like) over the telephone network provides an improved user experience.

Figure 7:
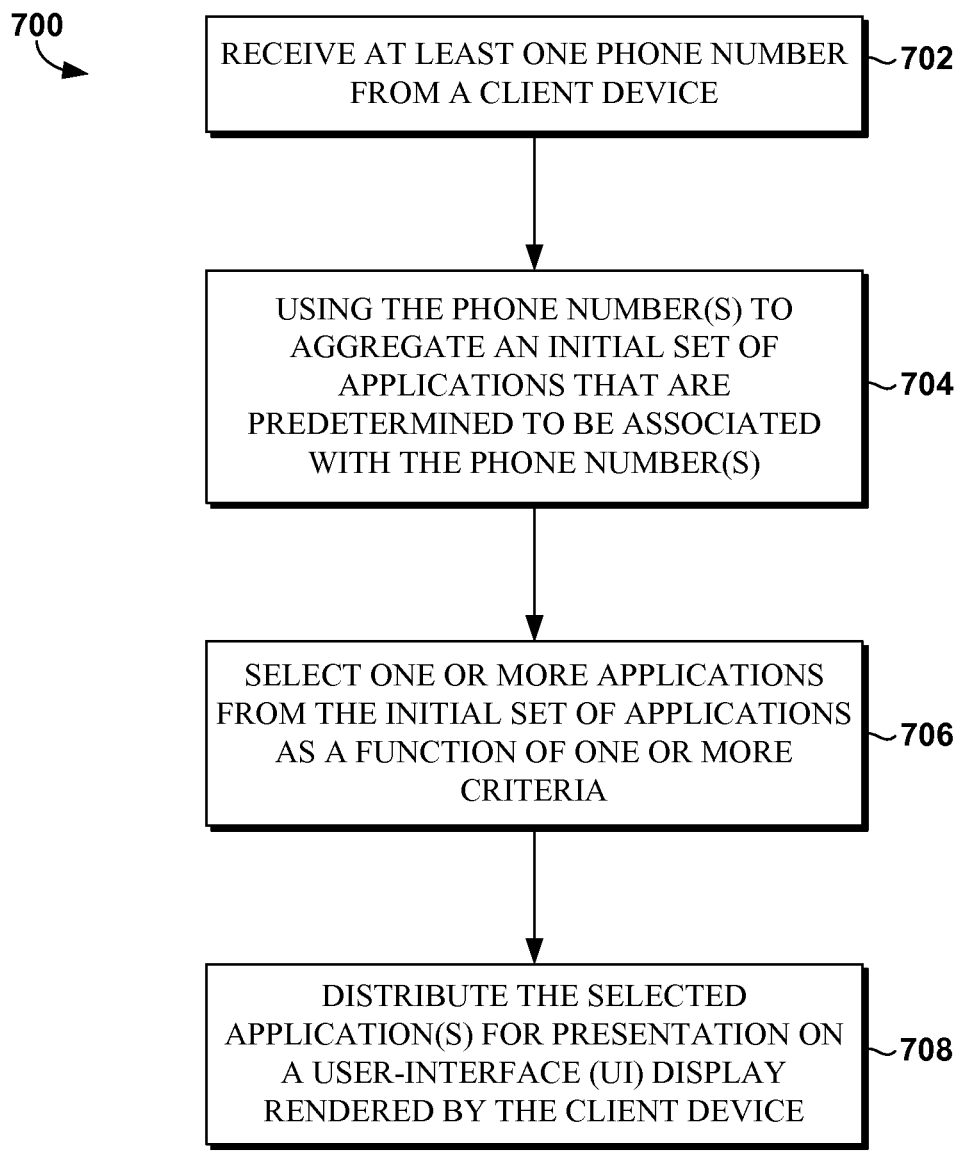
FIG. 7 is an overall flow diagram of a method for surfacing one or more applications as a function of at least one phone number, in accordance with embodiments of the invention.

Turning now to FIG. 7, an overall flow diagram of a method 700 for surfacing one or more applications as a function of at least one phone number is shown, in accordance with embodiments of the invention. Although the terms "step" and/or "block" may be used herein to connote different elements of methods employed, the terms should not be interpreted as implying any particular order among or between various steps herein disclosed unless and except when the order of individual steps is explicitly described. Initially, the method 700 involves receiving a phone number from a client device (see block 702) and using the phone number to aggregate an initial set of applications that are predetermined to be associated with the phone number (see block 704). One or more applications may be determined from the initial set of applications as a function of one or more criteria, as indicated at block 706. In one instance, the criteria include a user profile compiled upon monitoring actions taken by a user of the client device, such that selecting the applications comprises sorting the initial set of applications based on their respective relevance to data stored within the user profile. In another instance, the criteria include an amount of available area that exists within a call screen to present the selected applications, such that selecting the applications comprises limiting a number of the initial set of applications being selected based on the available area. Upon selecting the applications, the selected applications are distributed for presentation on a user-interface (UI) display rendered by the client device, as indicated at block 708.

Figure 8:
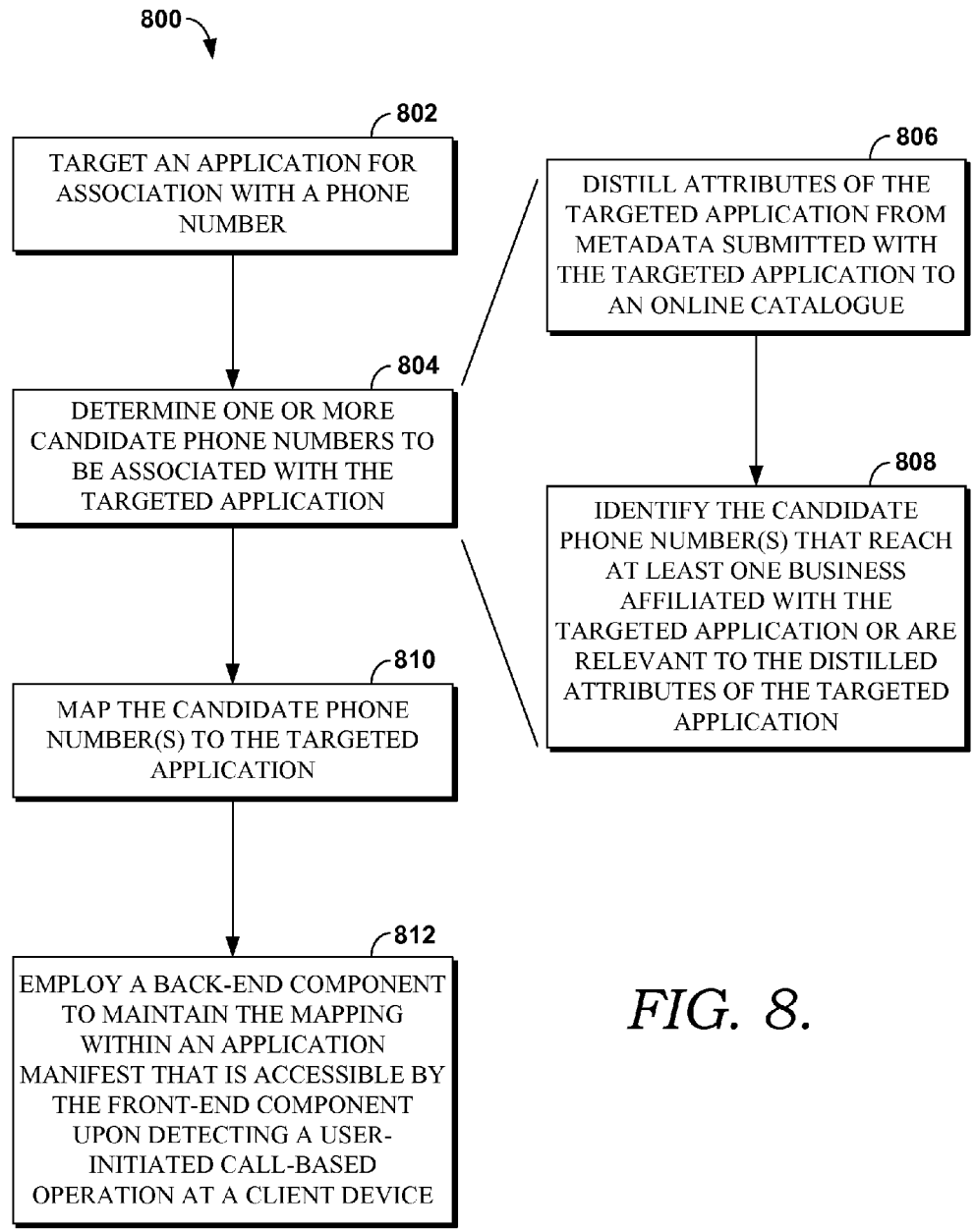
FIG. 8 is an overall flow diagram of a method for mapping one or more candidate phone numbers to a targeted application, in accordance with embodiments of the invention.

With reference to FIG. 8, an overall flow diagram of a method 800 for mapping one or more candidate phone numbers to a targeted application is shown, in accordance with embodiments of the invention. Initially, the method 800 may be carried out by a front-end component interacting with a back-end component running on at least one processor. The method 800 initially involves targeting an application for association with a phone number (see block 802) and determining candidate phone numbers to be associated with the targeted application (see block 804). In one instance, the process of determining involves the following steps: distilling attributes of the targeted application from metadata linked to the targeted application within an online catalogue (see block 806); and identifying the candidate phone numbers that reach at least one business affiliated with the targeted application or are relevant to the distilled attributes of the targeted application (see block 808). The method 800 may continue by mapping the candidate phone numbers to the targeted application (see block 810) and employing the back-end component to maintain the mapping within an application manifest that is accessible by the front-end component upon detecting a user-initiated call-based operation at a client device (see block 812).

Various embodiments of the invention have been described to be illustrative rather than restrictive. Alternative embodiments will become apparent from time to time without departing from the scope of embodiments of the inventions. It will be understood that certain features and subcombinations are of utility and may be employed without reference to other features and subcombinations. This is contemplated by and is within the scope of the claims.

The invention claimed is:

1. One or more computer-storage media having embodied thereon computer-executable instructions that, when executed, perform surfacing one or more applications as a function of at least one phone number, the instructions configured to:

receive the at least one phone number from a client device, the at least one phone number being from a phone number context currently occurring on the client device, the phone number context being one of an outgoing call, an incoming call, a call-history log, or an online directory;

identify, using the at least one phone number, an initial set of applications that are ranked for a current stage of the phone number context currently occurring on the client device, the initial set of applications predetermined to be associated with the at least one phone number, an application being software designed to be executed by an operating system hosted on the client device to assist a user in performing a singular or multiple-related specific task, the initial set of applications being ranked for each stage of the phone number context occurring on the client device based on an ability of the application to assist the user in performing a task related to the current stage of the phone number context occurring on the client device, and stages of the phone number context including call-start stage, call-connected stage, and call-ended stage;

select the one or more applications from the initial set of applications as a function of one or more criteria and the current stage of the phone number context associated with the at least one phone number, the selected one or more applications being ranked highest for the current stage of the phone number context; and distribute the one or more selected applications for presentation on a user-interface (UI) display rendered by the client device during the current stage of the phone number context currently occurring on the client device, the one or more selected applications being distributed for presentation differently based on the current stage of the phone number context, and the one or more selected applications being integrated with operational features of a call screen, a call-history listing, or a user's contact list.

2. The media of claim 1, wherein the at least one phone number represents an outgoing call number, and wherein distributing the one or more selected applications for presentation on the UI display comprises distributing an indicia of the one or more selected applications for presentation within a call screen configured for displaying the outgoing call number.

3. The media of claim 1, wherein the at least one phone number represents an incoming call number, and wherein distributing the one or more selected applications for presentation on the UI display comprises distributing an indicia of the one or more selected applications for presentation within a call screen configured for displaying the incoming call number.

4. The media of claim 1, wherein the at least one phone number represents an entry in the call-history listing, and wherein distributing the one or more selected applications for presentation on the UI display comprises distributing an indicia of the one or more selected applications for presentation within the call-history listing.

5. The media of claim 1, wherein the at least one phone number represents an entry in the user's contact list, and wherein distributing the one or more selected applications for presentation on the UI display comprises distributing an indicia of the one or more selected applications for presentation within the user's contact list.

6. The media of claim 1, wherein the one or more criteria include a user profile compiled upon monitoring actions taken by a user of the client device.

7. The media of claim 6, wherein selecting the one or more applications from the initial set of applications as a function of one or more criteria comprises sorting the initial set of applications based on their respective relevance to data stored within the user profile.

8. The media of claim 1, wherein the one or more criteria include an amount of available area that exists within a call screen to present the one or more selected applications.

9. The media of claim 8, wherein selecting the one or more applications from the initial set of applications as a function of one or more criteria comprises limiting a number of the initial set of applications being selected based on the available area.

10. The media of claim 1, wherein the instructions are further configured to automatically downloading the one or more selected applications to the client device.

11. The media of claim 10, wherein the instructions are further configured to automatically launching the one or more downloaded applications on the client device.

12. The media of claim 11, wherein the one or more downloaded applications are automatically launched at an entry point showing content relevant to the phone number context.

13. The media of claim 1, wherein distributing the one or more selected applications for presentation on the UI display rendered by the client device comprises distributing a control button for presentation proximate to a visual representation of the one or more selected applications, and wherein, upon selection, the control button is configured to invoke an action with respect to the one or more selected applications.

14. The media of claim 1, wherein when the user selects one of the one or more selected applications for presentation, and the user-selected application has previously been downloaded to the client device, the user-selected application is launched at an entry point showing content relevant to the phone number context.

15. A computer system for selecting one or more applications using at least one phone number, the computer system comprising:
　a data store for maintaining an application manifest comprising a listing of applications mined from an application marketplace, the applications within the listing being mapped to phone numbers; and
　a server comprising a processing unit coupled to a computer readable-medium, the computer-readable medium having stored thereon a plurality of computer software components executable by the processing unit, the computer software components comprising:
　　(a) a back-end component for mapping the phone numbers to an initial set of applications based, in part, on one or more attributes of the initial set of applications, the initial set of applications being ranked for each stage of a phone number context occurring on a client device based on an ability of the application to assist a user in performing a task related to a current stage of the phone number context occurring on the client device, the phone number context being one of an outgoing call, an incoming call, accessing a call-history log, or reviewing an online directory, and stages of the phone number context including call-start stage, call-connected stage, call-ended stage; and
　　(b) a front-end component for detecting that the user has entered the phone-number context on the client device, for extracting the at least one phone number from the phone-number context, for comparing the at least one phone number against the listing of applications within the application manifest to identify one or more applications from the initial set of applications that correspond with the at least one phone number based, in part, on the current stage of the phone number context associated with the at least one phone number, and for communicating the one or more identified applications to the client device for presentation to a user thereof, the one or more identified applications being ranked highest for the current stage of the phone number context, and the one or more identified applications being integrated with operational features of a call screen, a call-history listing, or a user's contact list based on the current stage of the phone number context.

16. The system of claim 15, wherein the front-end component is further configured to detect additional interactions of the user occurring at the client device upon carrying out phone number context thereon.

17. The system of claim 15, wherein the back-end component is further configured to mine applications from the application marketplace—and to dynamically update the mapping between the applications and their associated phone numbers.

18. A computerized method carried out by a front-end component interacting with a back-end component running on at least one processor, the method comprising:
　targeting an application for association with a phone number, an application being software designed to be executed by an operating system hosted on a client device and assist a user in performing a singular or multiple-related specific task, and the application not being associated with phone numbers in existing catalogues or application metadata;
　determining one or more candidate phone numbers to be associated with the targeted application, the determining comprising:
　　(a) distilling attributes of the targeted application from metadata linked to the targeted application within an online catalogue; and
　　(b) identifying the one or more candidate phone numbers that reach at least one business affiliated with the targeted application or are relevant to the distilled attributes of the targeted application; and
　employing the back-end component to:
　　map the one or more candidate phone numbers to the targeted application for storage in an application manifest that is accessible by the front-end component, the application manifest comprising a listing of applications mined from an application marketplace, the listed applications within the listing being mapped to the one or more candidate phone numbers;
　　rank the targeted application against other listed applications in the application manifest for the one or more candidate phone numbers for each stage of a phone number context occurring at the client device, the phone number context being one of an outgoing call, an incoming call, a call-history log, or an online directory, the stages of the phone number context including call-start stage, call-connected stage, and call-ended stage, and the targeted application and other listed applications being ranked based on an ability of the targeted application and other listed applications to assist the user in performing the singular or multiple-related task related to a current stage of the phone number context occurring on the client device;
　　associate the targeted application with the ranking; and
　　maintain the mapping within the application manifest upon detecting a user-initiated call-based operation at the client device.

19. The computerized method of claim 18, wherein the attributes distilled from the metadata of the targeted application comprise at least one of functionality of the targeted application, content within a web address or web page associated with the targeted application, or information submitted with the targeted application when uploading to the online catalogue.

20. The computerized method of claim 18, wherein the one or more candidate phone numbers that reach at least one business affiliated with the targeted application include a local listing of a retailer that offers products or services that relate to the targeted application.

* * * * *